Nov. 7, 1933.  C. W. ROBBINS  1,934,377
CONVEYER SYSTEM
Filed March 10, 1932   2 Sheets-Sheet 1
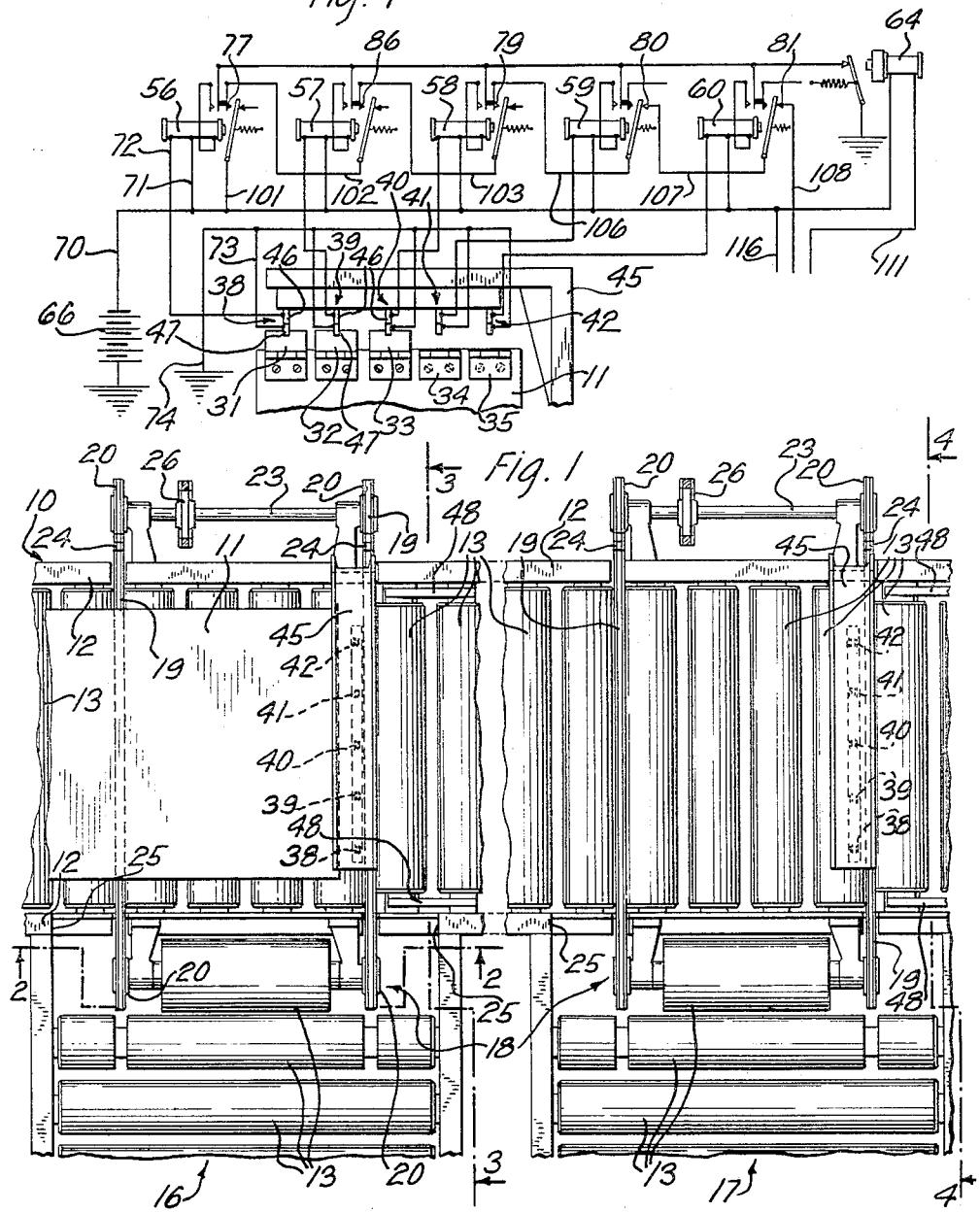
Inventor
C. W. Robbins
By H. A. Whitehorn Atty

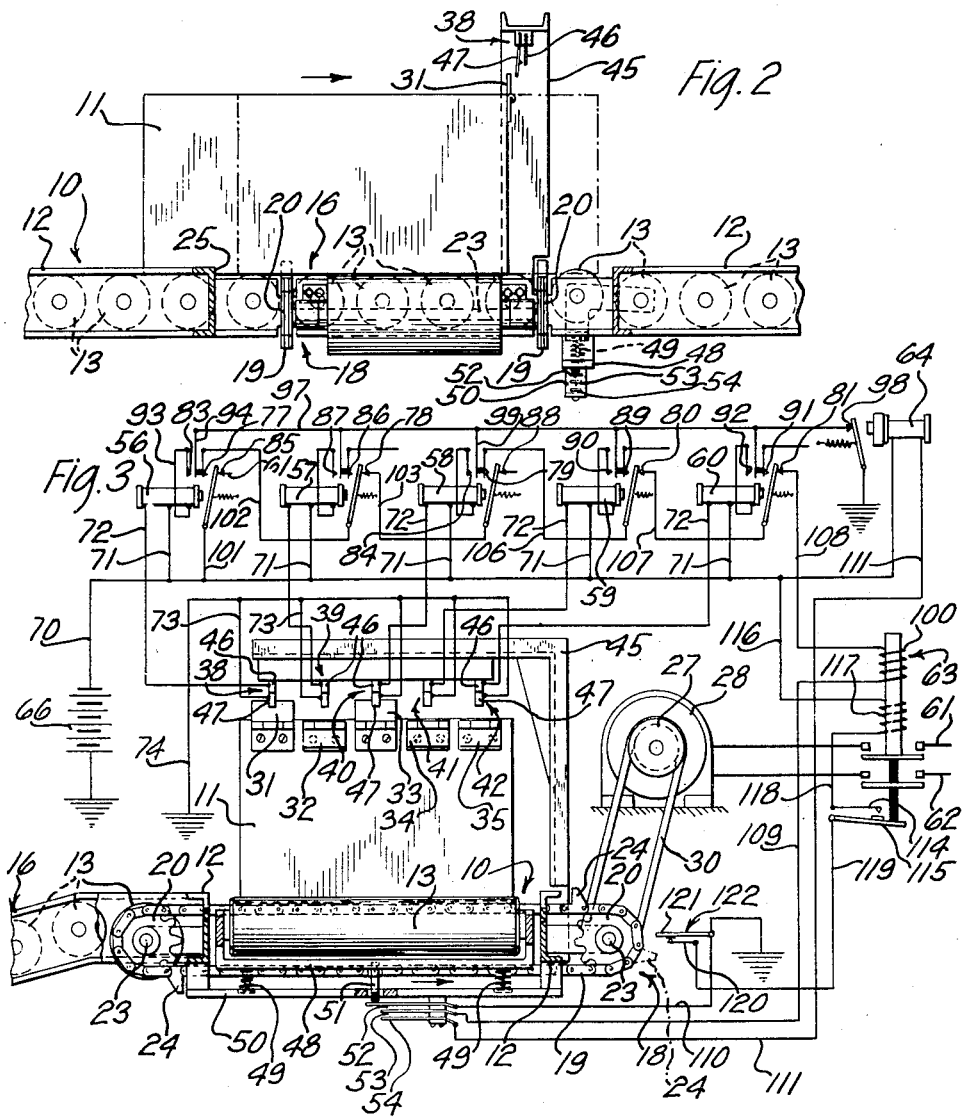

Patented Nov. 7, 1933

1,934,377

UNITED STATES PATENT OFFICE 1,934,377

CONVEYER SYSTEM

Charles W. Robbins, La Grange, Ill., assignor to Western Electric Company, Incorporated, New York, N. Y., a corporation of New York Application March 10, 1932. Serial No. 597,963

12 Claims. (Cl. 198—38)

This invention relates to conveyer systems, and more particularly to switching mechanisms for selectively and automatically transferring articles from one conveyer to another for distribution to different points.

The primary object of the invention is to provide a simple, efficient and flexible switching mechanism for conveyer systems.

In accordance with one embodiment of the invention, as used in connection with a conveyer system which includes a main conveyer line and a plurality of branch lines leading therefrom, there is provided a switching mechanism for each branch line which includes a carrier transfer means, an individual electrical circuit including a plurality of relays for controlling an electrical motor circuit, individual thereto, for causing an actuation of the transfer means through a predetermined operating cycle. In order that the carriers may automatically select the desired branch line, the relays of each individual circuit are responsive to a predetermined setting of an electrical switch controlling member or a combination thereof positioned on the carrier and when a carrier reaches a point on the main line adjacent the branch line to which it is to be transferred, the switch controlling members engage and actuate corresponding switches of the individual circuit and the relays connected thereto are energized and maintained energized until the carrier reaches a predetermined point on the main line. At this point other switches are actuated and a circuit conditioned by the energized relays is completed for effecting the actuation of the transfer means and upon the carrier being transferred, the relay and motor circuits and the transfer means are conditioned for another switching operation.

Other objects and advantages of this invention will more fully appear from the following detailed description taken in connection with the accompanying drawings, in which Fig. 1 is a fragmentary plan view of one embodiment of a conveyer system to which the features of this invention are applicable;

Fig. 2 is a fragmentary vertical sectional view taken on the line 2—2 of Fig. 1, and Figs. 3 and 4 are fragmentary vertical sectional views taken on the lines 3—3 and 4—4, respectively, of Fig. 1, showing schematically the electrical circuits for controlling the switching mechanisms, respectively, at two of the branch lines of the conveyer system.

Referring now to the drawings, the numeral 10 designates generally a main line of a conveyer system by means of which articles, containers or carriers 11 may be conveyed to any one of a plurality of destinations. The main conveyer line includes side rails 12 having power driven rolls 13 journaled therebetween, the carriers 11 being supported upon the rolls and carried forwardly by a rotation thereof. The rolls 12 are driven at a predetermined speed by a suitable source of power such as a belt (not shown) traveling underneath them. As shown in Fig. 1, branch conveyer lines 16 and 17 diverge at right angles from the main conveyer line 10 and structurally are substantially similar to that of the main line. The branch lines 16 and 17 may be disposed in a horizontal plane provided with power driven rolls or may be of the downwardly inclined gravity type, being herein shown as of the latter type wherein the carrier 11 is moved along the branch line by gravity after it has been transferred thereto from the main line.

Any suitable power driven switching means may be employed at each of the branch lines for effecting a transfer of a carrier 11 from the main line 10 to the branch lines. The type of carrier transfer means, for instance, shown in the drawings for each of the branch lines and designated by the numeral 18 consists of a pair of endless sprocket chains 19 in spaced relation and extending across the main line 10 in suitable alignment with the branch line and mounted on sprockets 20 fixed to shafts 23 journaled on the side rails 12 of the main line. The sprocket chains 19 are spaced so that they each travel between two adjacent rolls 13 of the main line (Fig. 1) with the upper lengths of the chains disposed slightly below the upper plane of the rolls 12 so that the bottoms of the carriers 11 do not engage the chains. Mounted on each of the chains 19 is a pair of spaced lugs 24 (Fig. 3), the lugs of each chain being aligned with the corresponding lugs of the opposite chain. The lugs 24 extend outwardly from the perimeter of the chain 19 so that when the chains are caused to travel in the direction of the arrow (Fig. 3) the pair of lugs which are at the right side of the carrier 11 will engage the same and cause it to be transferred transversely of the main line to the rolls 13 of the branch line. The side rail 12 of the main line 10 at the side from which the branch lines 16 and 17 diverge is notched as indicated at 25 (Fig. 1) to permit the carriers 11 to be moved from the main line to the branch line. After the chains 19 have advanced the carrier 11 a predetermined distance onto the branch line they are stopped and in this position the other pair of lugs 24 thereof will be stopped at a point outside of the right ends of the rolls 13 of the main line, taking the place of the lugs 24, which last advanced the carrier. One of the sprocket shafts 23 has fixed thereto a pulley 26 which is driven from a pulley 27, fixed to a shaft of an electric motor 28, by means of a belt 30. The motor 28 is preferably of the type which includes a solenoid brake (not shown) whereby when the current to the motor is cut off the brake is applied and is released upon the current being applied to the motor and is maintained released as long as the motor is running. This serves to hold the chain lugs 24 in their stopped position to be ready for the next transfer operation.

The forward upper ends of each of the carriers 11, which are conveyed in the direction of the arrow (Fig. 2), are provided with a transverse row of five hinged electrical switch actuating members or plates 31, 32, 33, 34 and 35, which are adapted to be individually and selectively moved into an operative raised position such as is shown, for example, in the case of the plates 31 and 33 or into an inoperative lowered position such as is shown in the case of the plates 32, 34 and 35 (Fig. 3). The switch actuating plates 31 to 35, inclusive, are hinged to the forward upper end of the carrier 11 in such a position that when they are in their operative vertical positions the rear surfaces abut the forward end wall of the carrier which serves as a stop member. This prevents the plates 31 to 35, inclusive, from moving counterclockwise when they are moved into engagement with a transverse row of electrical switches 38, 39, 40, 41 and 42 lying in the path thereof. A series of the switches 38 to 42, inclusive, is provided at each branch line of the conveyer system, each series thereof being carried upon a frame 45 supported from one of the side rails 12 of the main conveyer line 10 at each branch line.

The switches 38 to 42, inclusive, in the embodiment illustrated in the drawings, each comprise a pair of spaced resilient contacts 46 and 47 fixed to and depending from the frame 45 (Figs. 2 and 3), but any suitable type of switch may be employed. The contacts 46 and 47 are normally open as shown in Fig. 2 and the contact 47 is of such a length that it extends below the lower end of the contact 46 into the path of its corresponding switch actuating plate, of the series 31 to 35, inclusive, which at the time may be in an operative raised position. As the carrier 11 is advanced toward the right (Fig. 2) each of the plates 31 to 35, inclusive, which have been moved upwardly will engage its corresponding resilient contact 47, and cause the latter to be engaged with its companion resilient contact 46 and finally pass to the right of both contacts. Due to the resiliency of the contacts 46 and 47 this movement of the raised plates 31 to 35, inclusive, past the contacts is readily accomplished without deleterious effects thereto and the resilient contacts immediately spring back to their normal open position. The selected contacts of this series together with the contacts described in the next paragraph serve to condition a circuit (described later) for starting the motor 28.

An idler roll 13 of the main line 10 at the right of the frame 45 carrying the switches 38 to 42, inclusive, and a predetermined distance from the point at which the switch actuating plates 31 to 35, inclusive, engage the switches is journaled in a U-shaped frame 48 having arms pivoted on the shaft of the next roll 13 at the right thereof (Fig. 2). The frame 48 is normally urged upwardly by a pair of compression springs 49 mounted between the lower surface of the frame 48 and a stationary U-shaped frame 50 extending between and fixed to the lower surfaces of the side frames 12. Normally the position of the yieldably mounted frame 48 is such that the upper portion of the periphery of the roll 13 journaled thereon is slightly above the corresponding portions of the other rolls 13 of the main line. Fixed to the lower end of the frame 48 and extending freely through an aperture in the frame 50 is an electrical switch actuating member 51 (Fig. 3) which when the forward end of the carrier 11 moves onto the yieldable roll 13, actuates resilient contacts 52, 53 and 54.

In the circuit controlled by the above contacts are five electromagnetic relays 56, 57, 58, 59 and 60, corresponding to the five plates 31 to 35, inclusive, and in the operation of the individual circuit one or all of the relays thereof or a certain combination thereof are energized. Each of the relays 56 to 60, inclusive, is provided with an operating winding and a holding winding. The operating windings are connected to the respective contacts 46 of the series of switches 38 to 42, inclusive, so that they may be selectively actuated by said switches.

Each of the relays 56 to 60, inclusive, is equipped with a normally closed back contact and right and left normally open front contacts. The relays at any given station which are to be selected for operation by those of the plates 31 to 35, inclusive, which have been raised into an operative position upon the carrier 11, which is to be switched at that branch line, have their circuit completing connections made to the right front contacts and the relays corresponding to the plates which are not in an operative position have these connections made to the back contacts. The back contacts of relays 56 and 58 and the right front contacts of relays 57, 59 and 60 are not used in the particular circuit illustrated in Fig. 3 but are each shown with a short lead or conductor connected thereto ready to be used in case it should be desired to use another combination of the plates 31 to 35, inclusive, for the branch line 16.

The motor 28 receives its power from a pair of line wires 61 and 62 connected to a suitable source of power (not shown) and the current to the motor is controlled by a solenoid switch 63 having an operating winding 100 and a holding winding 117. The operating winding 100 is arranged to be included in the circuit closed by armatures of the series of relays in case the given switching point has been selected for actuation. This circuit extends to ground through contacts 52 and 53. The contact 54 associated with the latter controls a circuit extending through a slow acting relay 64, which serves to break the holding circuits of the selected relays. The switch 63 and the relay 64 are actuated from a low voltage grounded battery 66, when circuits are completed therethrough, the battery 66 also serving to actuate the relays 56 to 60, inclusive, and a lock-up circuit therefor as soon as the relays are actuated.

Referring to Fig. 3 wherein the electrical circuit for the transfer means 18 of the branch line 16 is schematically illustrated in conjunction with the elements of the transfer means it will be observed that the hinged plates 31 and 33 of the carrier 11 are in their upper operative positions and the plates 32, 34 and 35 are in their lowered inoperative positions which is the selected combination thereof for the branch line 16. With this combination of the plates 31 to 35, inclusive, on a carrier 11, which is to be transferred from the main conveyer line 10 to the branch line 16, the following electrical circuit will be completed when the plates 31 and 33 of the carrier 11 reach a predetermined point on the main line 10 adjacent the actual point of transfer thereof to the branch line 16, during the advance of the carrier 11 in the direction of the arrow (Fig. 2). As the plates 31 and 33 advance past the resilient contacts 46 and 47 of the switches 38 and 40, respectively, a circuit is completed from the grounded battery 66, through a line 70, lead 71 connected to the operating winding of the relay 56, a lead 72 also connected to the other terminal of the winding, the closed contacts 46 and 47, lead 73 and line 74 to ground. A similar circuit may be traced in connection with the relay 58 through the closed contacts 46 and 47 of the corresponding switch 40.

This results in the energization of the relays 56 and 58 and the pulling over of the armatures thereof, while relays 57, 59 and 60 are not energized. Thus a right front contact 77, back contact 78, right front contact 79 and back contacts 80 and 81 of relays 56, 57, 58, 59 and 60, respectively, are closed as well as left front contacts 83 and 84 of the relays 56 and 58, respectively. At the same instant back contact 85, right and left front contacts 86 and 87, back contact 88, right and left front contacts 89 and 90 and right and left front contacts 91 and 92 of relays 56, 57, 58, 59 and 60, respectively, are opened. This, it will be apparent, also completes at the same instant as the completion of the above circuit a lock-up circuit for the relay 56 from the grounded battery 66, line 70, lead 71, through the holding winding of the relay 56, a lead 93, the contact 83, a contact 94 insulated from the contact 77 but engaged with the contact 83 when the armature of the relay 56 was pulled over, line 97, contact 98 and the armature of the slow acting relay 64 to ground. A similar lock-up circuit may be traced in connection with the relay 58 through the contact 84 and a contact 99 engaged therewith when the armature of the relay 58 was pulled over.

It will be obvious that the last described circuits serve to hold the relays 56 and 58 energized and thus lock-up the armatures thereof in contact with the contacts 77 and 79, respectively, after the plates 31 and 33 have moved past the switches 38 and 40 in the continued advance of the carrier. In other words, when the plates 31 to 35, inclusive, have all passed their respective contacts 46 and 47, the armatures of the relays 56 and 58 corresponding to the operatively positioned plates 31 and 33 will be locked up, the armatures of the other relays remaining in their normal retracted position. This provides a continuous circuit from the grounded battery 66 through the operating winding 100 of the solenoid switch 63 to the contact 53, which may be traced as follows: Battery 66, line 70, a lead 101, the armature of the relay 56, contact 77, a lead 102, the armature of the relay 57, a lead 103, the armature of the relay 58, contact 79, a lead 106, the armature of the relay 59, contact 80, a lead 107 to the armature of the relay 60, contact 81, line 108, through the operating winding 100 of the switch 63, a line 109, and to the contact 53. The circuit for actuating the solenoid switch 63 which closes the circuit to the motor 28 is thus conditioned ready for completion up to the normally open contact 53 which is closed in the following manner.

In the continued advance of the carrier 11 on the main conveyer line 10 and shortly after the plates 31 and 33 have actuated the switches 38 and 40, the forward end of the carrier moves onto the yieldably supported roll 13, as shown by the dotted outline position of the carrier in Fig. 2. In this position the carrier 11 is aligned with the notched porton 25 of the side rail 12 of the main line 10 and is ready to be transferred to the branch line 16. As the carrier 11 moves onto the yieldably supported roll 13 the switch actuating member 51 will be moved downwardly and close the normally open contacts 52 and 53, thus completing the circuit through conductor 109 and grounded conductor 110 for operating the solenoid switch 63 which was previously conditioned for completion up to the contact 53.

The operating winding 100 of the solenoid switch 63 is thus energized and thereby an upward movement of the solenoid core is effected to cause the closing of associated contacts which connect the line wires 61 and 62 to the motor 28, the solenoid brake of which is immediately released and the carrier transfer means 18 is set in motion. The lugs 24 carried by the chains 19 predeterminedly positioned at the right of the carrier 11 (Fig. 3) upon the completion of the last preceding cycle of operation of the transfer means 18 advance into engagement with the carrier and transfer it transversely from the main conveyer line 10 to the rolls 13 of the branch line 16 upon which it thereafter moves by gravity.

This transfer of the carrier 11 to the rolls 13 of the branch line 16 permits the yieldably supported roll 13 of the main line 10 to move upwardly, thereby permitting the resilient contacts 52, 53 and 54 to move to their normal open position ready for the next transfer operation. The opening of the contacts 52, 53 and 54 has no effect on the closed circuit to the motor 28, since the holding circuit thereof was completed previous to the opening of the contacts.

Substantially at the same instant that the motor circuit, above described, was completed for setting in motion the transfer means 18 when the switch controlling member 51 was moved downwardly the contacts 53 and 54 will be closed, thus completing a circuit from the battery 66, line 70, through the winding of the slow acting relay 64, line 111, contacts 54, 53 and 52 and line 110 to ground. Thus the relay 64 is energized and the armature thereof is pulled over from its normal engagement with the contact 98 thereby opening the lock-up circuit of the relays 56 and 58 and permitting their armatures to move to their normal position as shown in Fig. 3 ready for the next switching operation. This, it will be obvious, breaks the circuit through the energized operating winding 100 of the solenoid switch 63, but the circuit to the motor 28 is not broken at this time due to the holding circuit, previously completed, which holds the core of the switch 63 in its upper position thus maintaining the motor circuit closed until the operation of the transfer means 18 is completed.

The upward movement of the core of the switch 63, previously described, permitted normally open resilient contacts 114 and 115 associated with the lower insulated end of the core to close. A circuit is thus completed from the battery 66, line 70, a lead 116, through the holding winding 117 of the switch 63, a lead 118, contacts 114 and 115, a lead 119, normally closed resilient contacts 120 and 121 of a switch 122, and line 110 to ground. The contact 121 of switch 122 lies in the path of movement of the lugs 24 of one of the chains 19. This holding circuit is held closed until the contacts 120 and 121 are broken by the engagement and movement past the resilient contact 121 of the lug 24 which advanced the last previously transferred carrier 11, the lug at the beginning of a transfer operation being positioned at the under side of the chain 19 at the left end thereof. This holding circuit is held closed for a period of time sufficient to cause an actuation of the transfer means 18 through a complete operating cycle and upon completion thereof is broken by the opening of the contacts 120 and 121 by means of the chain lug 24 (dotted outline Fig. 3) advancing therepast. The opening of the holding circuit at the contacts 120 and 121 de-energizes the holding winding 117 whereupon the core of the switch 63 rapidly moves downwardly disconnecting the line wires 61 and 62 from the motor 28 and opening the circuit to the switch 122 at the contacts 114 and 115 before the contacts 120 and 121 close again as the chain lug 24 moves past the contact 121 after breaking the circuit at this point and comes to a stop. The entire transfer means circuit is now conditioned for another switching operation.

When the circuit to the motor 28 is opened the solenoid brake of the motor is applied and the transfer means 18 immediately stops with the chain lugs 24 thereof in the positions shown in Fig. 3. The switch 122 is positioned at such a distance from the position of rest of the lug 24, that the lug will travel this distance while the brake is stopping the motor. The transfer means 18 is now ready for the next transfer operation.

In Fig. 4 an electrical circuit for the transfer means 18 of the branch line 17 is fragmentarily illustrated. The particular combination of the plates 31 to 35, inclusive, on the carrier 11, which have been chosen for the branch line 17, comprises the plates 31, 32 and 33 and therefore are shown in their vertical operative positions and consequently in their advance with the carrier 11 on the main conveyer line 10 will close circuits through their corresponding switches 38, 39 and 40 to operate the relays 56, 57 and 58, respectively. The relays 56, 57 and 58 like the relays 56 and 58 previously described in connection with the circuit (Fig. 3) for the transfer means 18 of the branch line 16 have their circuit operating connections made to the right front contacts 77, 86 and 79, respectively, and the relays 59 and 60 corresponding to the plates 34 and 35, which are not in an operative position, have these connections made to the back contacts 80 and 81, respectively. In view of the previous detailed description and tracing of the circuits closed by the plates 31 and 33 of Fig. 3 a similar description and tracing of the circuits closed by the plates 31, 32 and 33 of Fig. 4 is not believed necessary.

It will be evident from the above description that this invention provides a simple switching mechanism for a conveyer system whereby carriers being conveyed thereon may be automatically transferred to predetermined branch lines thereof. The switching mechanism for a predetermined branch line is conditioned in advance of the carrier to be transferred thereto reaching the point of transfer by selective means adjustable on the carrier and upon the carrier reaching the point of transfer the switching or transfer means is caused to be set in operation by the position of the carrier to effect the transfer of the carrier and is then returned to its normal position ready for another transfer operation. By conditioning the transfer means for operation in advance of the carrier reaching the actual point of transfer the transfer means may be operated and returned to its normal position so that the following carrier which may have been abutting the transferred carrier and is also to be transferred to the same branch line may be transferred thereto without any delay in the operation of the transfer means or interference between the carriers.

In the embodiment of the invention which has been described and illustrated, five selecting plates and five relays corresponding thereto are used. Since any combination of one, two, three, four or five selecting plates may be used at a given transfer point, it is apparent that with this arrangement 31 transfer points may be provided in one conveyer system. In case a greater number of transfer points is required, the addition of one more selecting plate and one more relay in this chain of relays will very greatly increase the number of possible combinations. It is of substantial value to keep the number of selecting plates, or equivalent devices, such as pins, small, particularly in the case of small sized carriers, so that the breadth of contact area with the switches or equivalent devices may be kept large enough to avoid danger of missing the switch or of striking the wrong switch. Obviously, if narrow plates 31, etc., or narrow pins are used, the portion of the switch which is to be engaged should be made wider.

Although a specific embodiment of this invention has herein been disclosed and described, it is to be understood that other modifications and adaptations thereof may be made without departing from the scope of the appended claims.

What is claimed is:

1. In a conveyer system, a main conveyer for articles, a plurality of transfer points, transfer means at said transfer points, a source of electrical power for effecting the operation of the transfer means, selective means on each article being conveyed adjustable to determine the point of transfer thereof, means actuated by the selective means as the article being conveyed nears the selected transfer point for conditioning said source of electrical power for operation, and means responsive to a further predetermined movement of the article for causing said source of power to effect the operation of the transfer means.

2. In a conveyer system, a main conveyer for articles, a plurality of transfer points, electrically operated transfer means at said transfer points, selective means on each article being conveyed adjustable for a particular transfer point, an individual electrical circuit for each transfer means, each of said circuits including a plurality of switches positioned at a point in advance of the selected transfer point for the article and actuated by the selective means on the article for conditioning the circuit for operation, and means operable by the article upon reaching the transfer point for completing the circuit for effecting the operation of the transfer means.

3. In a conveyer system, a main conveyer for articles, a plurality of transfer points, electrically operated transfer means at said transfer points, selective means on each article being conveyed adjustable for a particular transfer point, an individual electrical circuit for each transfer means including a plurality of switches positioned at a point in advance of the selected transfer point for the article and actuated by the selective means on the article and a combination of electromagnetic means responsive to the actuation of the switches for conditioning the circuit for operation, and means engaged by the article upon reaching the transfer point for completing the circuit for effecting the operation of the transfer means.

4. In a conveyer system, a main conveyer for articles, a plurality of transfer points, transfer means comprising a selectable number of devices projecting from an article being conveyed, a chain of control devices equal in number to the maximum possible number of projecting devices, and means for actuating said transfer means under the control of said control means, provision being made for altering the connections between the control devices of said chain whereby the transfer means will be actuated by any one and only one of the possible combinations of said projecting means.

5. In a conveyer system, a main conveyer for articles, a transfer means at a transfer point, means for actuating said transfer means, an electrical control circuit for said actuating means comprising a series of relays, and a series of selectable switches for actuating said relays respectively, the operating contacts of said relays being so interconnected in said control circuit that the actuating means is operated only for one possible combination of said selectable switches.

6. In a conveyer system, a main conveyer for articles, a transfer means at a transfer point, an electric motor for actuating said transfer means, a circuit for supplying power to said motor, an electromagnetic device having operating and holding windings and contacts for closing said power supplying circuit and for energizing said holding winding, means controlled by an article being conveyed for energizing said operating winding, and a switch responsive to the operation of said transfer means after a predetermined movement thereof for opening the circuit through said holding winding.

7. In a conveyer system, a main conveyer for articles, a transfer means at a transfer point, switch controlling means on the article being conveyed, means for actuating said transfer means, an electrical control circuit for said actuating means including a relay having operating and holding windings, a slow acting relay, a solenoid switch having operating and holding windings, the operating winding of the switch upon energization actuating the switch to complete a circuit to said actuating means, a switch positioned in advance of the transfer point and actuated by the switch controlling means on the article for operating and holding said first relay operated for conditioning the circuit for operation, a switch operable by the article upon reaching the transfer point for completing the circuit through the operating winding of said solenoid switch to effect the operation of said transfer means and simultaneously completing a circuit through said slow operating relay for opening the circuit through the operating winding of said first relay, a switch responsive to the actuation of said solenoid switch for completing a circuit through the holding winding thereof, and a switch responsive to the operation of said transfer means after a predetermined movement thereof for opening the circuit through the holding winding of the solenoid switch for stopping the transfer means.

8. In a conveyer system, a main conveyer for articles, a plurality of transfer points, transfer means at each of said transfer points, a plurality of selectable switch controlling members on each article being conveyed adjustable for a particular transfer point, actuating means including an electric motor for each of said transfer means, an electric power circuit for said motor including a solenoid switch having operating and holding windings, an individual electrical control circuit for said actuating means comprising a plurality of relays having operating and holding windings, a corresponding number of switches positioned at a point in advance of the selected transfer point and actuated by the corresponding selected members on the article for operating and holding said relays which correspond to the selected members operated for conditioning the circuit for operation, a slow operating relay, a switch operable by the article upon reaching the selected transfer point for completing the circuit through the operating winding of said solenoid switch to effect the operation of said transfer means and simultaneously completing a circuit through said slow operating relay for opening the circuit through the operating windings of said selected relays, a switch responsive to the actuation of said solenoid switch for completing a circuit through the holding winding thereof, and a switch responsive to the operation of said transfer means after a predetermined movement thereof for opening the circuit through the holding winding of the solenoid switch for stopping the transfer means.

9. In a conveyer system, a main conveyer for articles, a transfer means at a transfer point, said transfer means including a switch controlling member movable therewith, switch controlling means on the article being conveyed, means for actuating said transfer means, an electrical control circuit for supplying power to said actuating means, an electromagnetic device having operating and holding windings and contacts for closing said power supplying circuit and for energizing said holding winding, a switch controlled by the controlling means on the article being conveyed for energizing said operating winding, and a switch controlled by said controlling member movable with the transfer means after a predetermined movement of the transfer means for opening the circuit through said holding winding.

10. In a conveyer system, a main conveyer for articles, a plurality of transfer points, transfer means comprising a selectable number of devices projecting from an article being conveyed, control means including a chain of relays equal in number to the maximum possible number of projecting devices, said relays being operated by said projecting devices, and means for actuating said transfer means under the control of said control means, provision being made for altering the connections between the relays of said chain whereby the transfer means will be actuated by any one and only one of the possible combinations of said projecting means.

11. In a conveyer system, a main conveyer for articles, a plurality of transfer points spaced along the path of the conveyer, transfer means at each transfer point, control means including a chain of relays at each transfer point, a selectable number of devices projecting from an article being conveyed for operating said relays, and means for operating said transfer means under the control of said relays, provision being made for altering the connections between the relays of said chain whereby each transfer means will be actuated only by a predetermined one of the possible combinations of said projecting means.

12. In a conveyer system, a main conveyer for articles, a plurality of transfer points spaced along the path of said conveyer, means for selectively transferring articles from said conveyer, control means comprising a selectable number of devices projecting from an article being conveyed and a chain of relays at each transfer point equal in number to the maximum possible number of projecting devices and operated thereby, and means for actuating said transfer means under the control of said relays, said relays at each transfer point being interconnected to be actuated only by a predetermined one of the possible combinations of said projecting devices.

CHARLES W. ROBBINS.